United States Patent
Reeves

(10) Patent No.: US 7,656,341 B2
(45) Date of Patent: Feb. 2, 2010

(54) NOISE AUGMENTED RADAR SYSTEM

(76) Inventor: Bryan Anthony Reeves, 3 Atlas Place, Chapel Hill, Queensland (AU) 4069

( * ) Notice: Subject to any disclaimer, the term of this patent is extended or adjusted under 35 U.S.C. 154(b) by 172 days.

(21) Appl. No.: 11/815,546

(22) PCT Filed: Feb. 8, 2006

(86) PCT No.: PCT/AU2006/000148

§ 371 (c)(1),
(2), (4) Date: Aug. 3, 2007

(87) PCT Pub. No.: WO2006/084307

PCT Pub. Date: Aug. 17, 2006

(65) Prior Publication Data

US 2008/0204309 A1    Aug. 28, 2008

(30) Foreign Application Priority Data

Feb. 9, 2005    (AU) ............... 2005900595

(51) Int. Cl.
*G01S 13/00* (2006.01)
(52) U.S. Cl. ......................... 342/22; 342/195
(58) Field of Classification Search ............ 342/22, 342/195, 203
See application file for complete search history.

(56) References Cited

U.S. PATENT DOCUMENTS

| 4,804,963 A * | 2/1989 | Clapham .......... 342/195 |
| 6,067,040 A | 5/2000 | Puglia |
| 6,091,354 A | 7/2000 | Beckner et al. |
| 6,121,915 A | 9/2000 | Cooper et al. |
| 6,392,585 B2 | 5/2002 | Huff et al. |
| 6,664,914 B2 | 12/2003 | Longstaff et al. |
| 2008/0204309 A1 * | 8/2008 | Reeves .......... 342/195 |

FOREIGN PATENT DOCUMENTS

WO    WO 2006084307 A1 *    8/2006

OTHER PUBLICATIONS

Axelsson, S.R.J., Noise radar for range/Doppler processing and digital beamforming using low-bit ADC (Abstract), IEEE Transactions on Geoscience and Remote Sensing, Dec. 2003, pp. 2703-2720, vol. 41 (12).
Axelsson, Sune R.J., Noise Radar for Range/Doppler Processing and Digital Beamforming Using Low-Bit ADC, IEEE Transactions on Geoscience and Remote Sensing, vol. 41, No. 12, Dec. 2003.
Koppenjan, Steven K., Multi-Frequency Synthetic-Aperture Imaging With a Lightweight Ground Penetrating Radar System, Journal of Applied Geophysics 43 (2000) 251-258.
Sachs, Jurgen, Integrated Digital UWB-Radar, Amerem 2002, Jun. 2-7, 2002, Annapolis, Maryland.

* cited by examiner

Primary Examiner—Dan Pihulic
(74) *Attorney, Agent, or Firm*—Kirton & McConkie; Evan R. Witt

(57) ABSTRACT

A radar system comprises a transmitter that transmits a predetermined wideband signal, a digital receiver that records a returned signal using a one-bit ADC, a random noise source that is added to the transmitted or returned signal, a processing means where the received signal is distorted to compensate for the effect of the noise on the receiver. The predetermined wideband signal may be a pseudo random noise signal. The processing may include averaging prior to cross-correlation.

20 Claims, 5 Drawing Sheets

NOISE AUGMENTED RADAR SYSTEM

FIELD OF INVENTION

This invention relates to wideband high quality radar that allows accurate imaging of targets. The invention can be applied to ground penetrating radar, wall imaging systems, through-wall imaging systems, vehicular radars and missile radars.

BACKGROUND OF THE INVENTION

Creating an ultra wideband radar system is important for all the above applications where high range resolution is required. There are a number of possible approaches to produce an extremely wide bandwidth for the transmission and reception circuits of a radar system. One approach is impulse radars as described in U.S. Pat. No. 6,091,354, U.S. Pat. No. 6,067,040 and S. Koppenjan et al., "Multi-frequency synthetic-aperture imaging with a lightweight ground penetrating radar system", Journal of Applied Geophysics 43, pp. 251-258, 2000. An alternate approach is to use a stepped frequency radar as described in U.S. Pat. No. 6,664,914.

However both these approaches have severe limitations. Impulse systems only receive a small percentage of the signal, so high transmission powers or long integration times are required to produce a high quality signal. Stepped Frequency or Frequency Modulated Continuous Wave (FMCW), is more efficient, but is not allowed under current US Federal Communications Commission (FCC) regulations as it has a narrow band transmission at any point in time.

Ideally, a wideband radar system would generate a signal that covers the entire radio spectrum eg from DC to 5 GHz. A receiver would then record the returned waveform at more than double the highest frequency in the transmission eg >10 Gsps. To enable the detection of both strong and weak signals, it is desirable to have a low digital quantisation noise and thus a high bit resolution (12-16 bits) Analog to Digital Converter (ADC) would be required. Gain control may also be required to allow a larger dynamic range as the signal gets weaker. However currently there are no 12 bit ADCs with sample rates >10 Gsps. At lower sample rates, ADCs do exist, but they are expensive and the digital control logic required to process the incoming data also increases the cost and complexity.

One approach to digitizing the signal is to under-sample the received signal. This is demonstrated in J. Sacks et al., "Integrated Digital UWB-Radar", AMEREM 2002, 2-7 Jun. 2002, Annapolis, Md., where the transmission of a high frequency signal is repeated a number of times, each time sampling different elements of the returned signal. The problem is that as the receiver is not always active, the signal to noise performance of the system is reduced. However the reduction is not as severe as it would be with an impulse system.

Another approach for producing a wideband receiver is to reduce the number of bits in the ADC. This is because as the number of bits in the receiver reduces the complexity also reduces, thus allowing the speed to increase. The limit of this reduction is to simplify the ADC to a single bit or to a comparator. This allows the received signal to be continuously monitored however the output is only one bit. One example using a single bit ADC in a radar is the random noise automotive radar system suggested in U.S. Pat. No. 6,121,915 and U.S. Pat. No. 6,392,585 B2. This system uses a random noise source as the transmitter. The receiver uses two comparators, one sampling the transmitted signal and the other sampling the received signal. By cross correlating these two waveforms, a range profile can be produced. Unfortunately, this approach has limited range and dynamic response due to the size of the cross correlation array. It also requires the design of a large and complicated Application Specific Integrated Circuit (ASIC) chip to achieve the cross correlation in real time.

OBJECT OF THE INVENTION

It is therefore an object of the present invention to provide a radar which overcomes some of the disadvantages of the prior art or at least provides a useful or less complicated alternative.

STATEMENT OF THE INVENTION

According to the present invention, a radar system comprises a transmitter that transmits a repeated signal, a digital receiver that records a returned signal, a random noise source that is added to the transmitted or returned signal to achieve dithering of the digital receiver, an integration means and a processing means.

Preferably the transmitted signal is a combination of a pseudo random noise signal combined with a pure random noise signal.

Preferably the receiver is a one bit analogue to digital converter (comparator).

Alternatively the receiver can be a multi-bit analogue to digital converter (ADC).

Preferably averaging of the returned signal is performed prior to cross-correction with the transmitted signal.

Preferably the random noise is added to the returned signal to achieve dithering of the lowest bit of the ADC.

Preferably the integration means combines a number of returns to form a high bit resolution of the returned signal.

Preferably the integration means is an accumulator that combines data in a circular buffer.

Preferably the processing means uses cross correlation with the transmitted signal to convert the returned signal into a range profile of the targets in the environment.

DETAILED DESCRIPTION OF THE INVENTION

Figure 1:
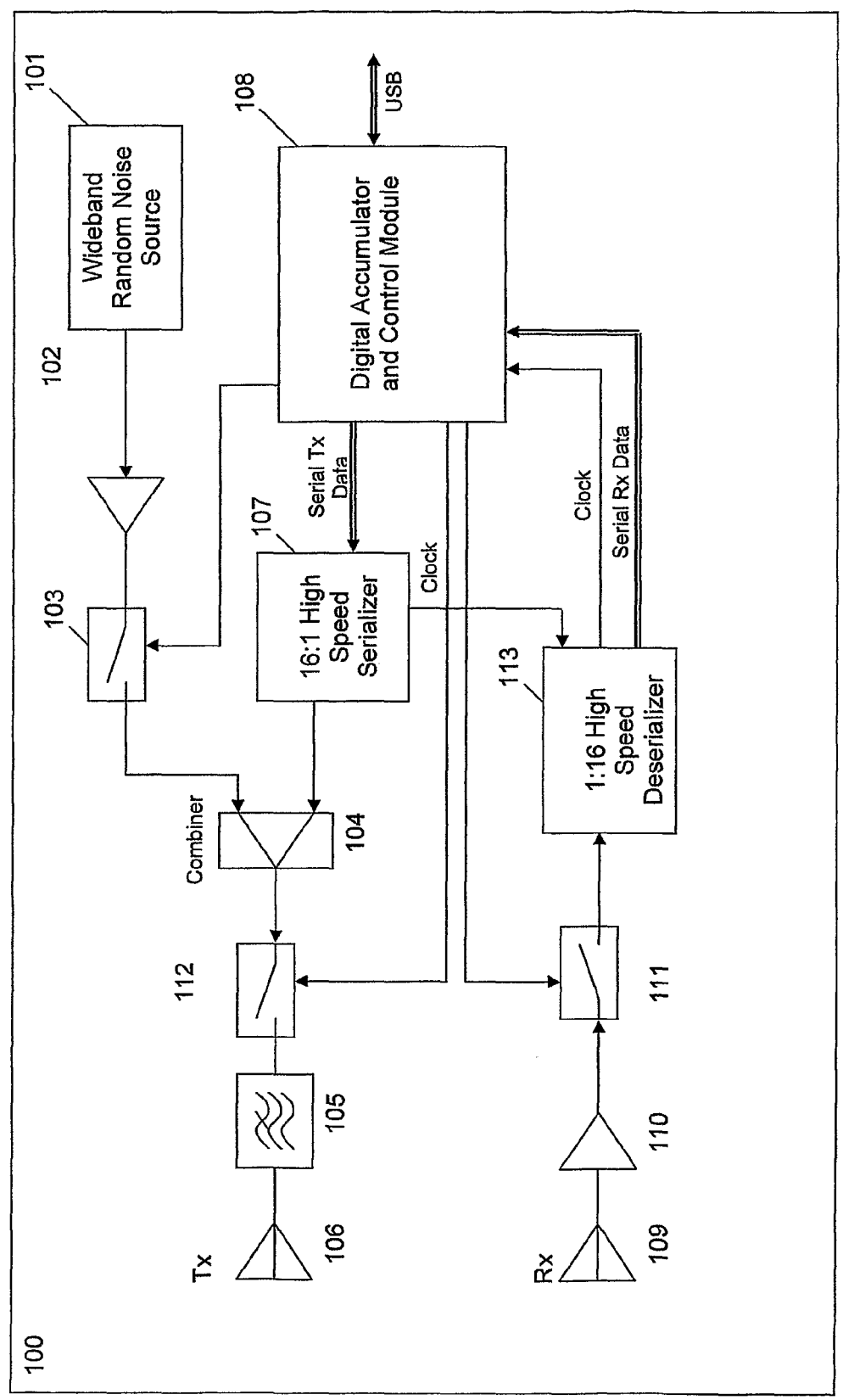
FIG. 1 is a block schematic of a radar module.

The radar module transmits a well defined wideband signal which is a pseudo random noise (PRN) signal generated via a serializer or 1 bit digital to analog converter (DAC). The pseudo random noise sequences or Gold codes, are ideally suited to this application as only a 1 bit output is required with a repeat rate of $2^n-1$. In the frequency domain, they have random phase and unity amplitude across the entire frequency band. Rejection of frequency bands or pre pinking of the noise, could be performed using a standard filter. Once generated, the antenna transmits this RF signal that bounces off targets in the environment and is collected by the receiver antenna.

The receiver uses a low-resolution 1 bit ADC (e.g. comparator) or a deserializer. It could also use a higher bit resolution ADC or a combination of a number of ADCs sampling the signal at different points in time. To achieve dithering of the receive signal, a pure random noise is injected into the signal. This could also be done on transmission by combining the known wideband signal with the random noise. Alternatively, the noise could be added on receive, before the ADC. However, enough noise should be injected to allow fluctuation of the lowest bit of the receiver and dithering could even be achieved by injecting the natural noise from the amplifier or ADC circuits. For a 1 bit receiver, the noise level should equal the signal level.

To change the signal from a high rate and low quality stream to a high quality radar return, the signal needs to be averaged. Averaging can be done using a circular buffer of length $2^n-1$. By averaging, the low quality signal improves, increasing the SNR. For example, with a 1-bit ADC, if there is no radar return, the 1-bit input signal will randomly fluctuate from 1 to −1. Averaging these signals will produce an average of 0 for the signal strength. When there is a signal which is below the quantisation level of the receive circuit, the random fluctuation of the signal will be biased on the positive or negative side. The stronger the signal in relation to the noise, the more likely it will produce the same sign input. The result is that after averaging, a value proportional to the signal strength will be produced. The quality of this averaged signal depends on the amount of samples taken. This is defined by the following formula:

$$SNR = 7.78 + 10 \log_{10}(p)$$

Where p is the number of synchronous averages. For example with 100,000 synchronous averages, a SNR of 57.78 dB is obtained. After the averaging step, cross correlation with the transmitted signal can be performed to produce the final time domain profile. This could be done in the radar module or later in the processing unit.

It is important to note that the SNR is relative to two noise sources. When the signal is weak, the dominant noise source is the thermal noise in the system. However when the signal is strong the dominant noise is the random noise added to the system. The result is that the system automatically reduces the strength of close targets, which is an advantage in GPR where the response from targets tapers quickly with respect to range.

It is also important to note that when the entire returned signal is below the noise floor the added random noise can be turned off. The result is that the one bit system will work as effectively as a high resolution ADC, as only the last bit of the high resolution ADC is being used (which in itself is a comparator). Alternatively, if the random noise is not removed, the signal is only 3 dB away from ideal.

The main purpose of adding the noise is to allow the detection of weak signals in the presence of strong signals. For example, with a strong signal when no noise is added, the value of the digitized received signal is always the same, either 1 or 0, for each range bin. The result of this is that only one signal can be detected in the receive path as it dominates all other signals. The added wideband noise stops the signal from always thresholding the receiver, allowing the weaker signals to be also detected. When there is a weak signal in the presence of a strong signal, the weak signal slightly distorts the amplitude of the strong signal, allowing it to be detected and the difference in their amplitudes determined. To ensure that the power of the added noise is equal to the signal strength, the noise can be added to the transmitted waveform. One advantage of this design is that adjustment of the receive amplification over time is not needed because the only determination required is whether the signal is positive or negative. This simplifies the receiver circuits.

The signal is gated by transmitting and receiving at different times. This improves the sensitivity of the receiver as no signals are being transmitted which would potentially overload the sensitive receive electronics. Also, for this embodiment, only part of the PRN sequence is transmitted each time. Instead, the result of a series of transmissions simulates the transmission of the full PRN sequence.

One of the major differences between the proposed radar system and other radars that use a comparator as a receiver (U.S. Pat. No. 6,121,915), is the combined use of both a predefine signal (PRN code) and a pure random signal. The use of the predefined signal in combination to the pure random signal, allows averaging to restore the repeated PRN code prior to cross correction. This reduces the complexity of the receive post processing required, allowing high-speed operation and higher signal quality.

FIG. 1 shows a radar system in which a pseudo random noise (PRN) signal is sent to the serializer 107, converting it from low speed parallel data to a high speed serial sequence. The signal from a ultra wideband noise source 101 is amplified 102 and then combined with the PRN stream 104. A switch 103 controls the output from the noise source. Finally the signal is filtered 105 to remove transmission over unwanted bands and then sent to the antenna 106. The signal from the receive antenna 109, is first amplified 110 before being sampled by a high speed deserializer 113. Extra switches 111, 112 can be used to increase isolation between the transmit and receive paths.

The digital accumulator and control module 108 controls the transmission of the signal and the accumulation of the one bit signal into a high quality, multi-bit signal. This accumulated signal is then transmitted over the usb link to a computer, where the signal is demodulated. For a vehicular radar system an up and down conversion stage would also be required to translate the signal from baseband into the higher frequency range of automotive radars. The same is likely to be true for missile radars.

Figure 2:
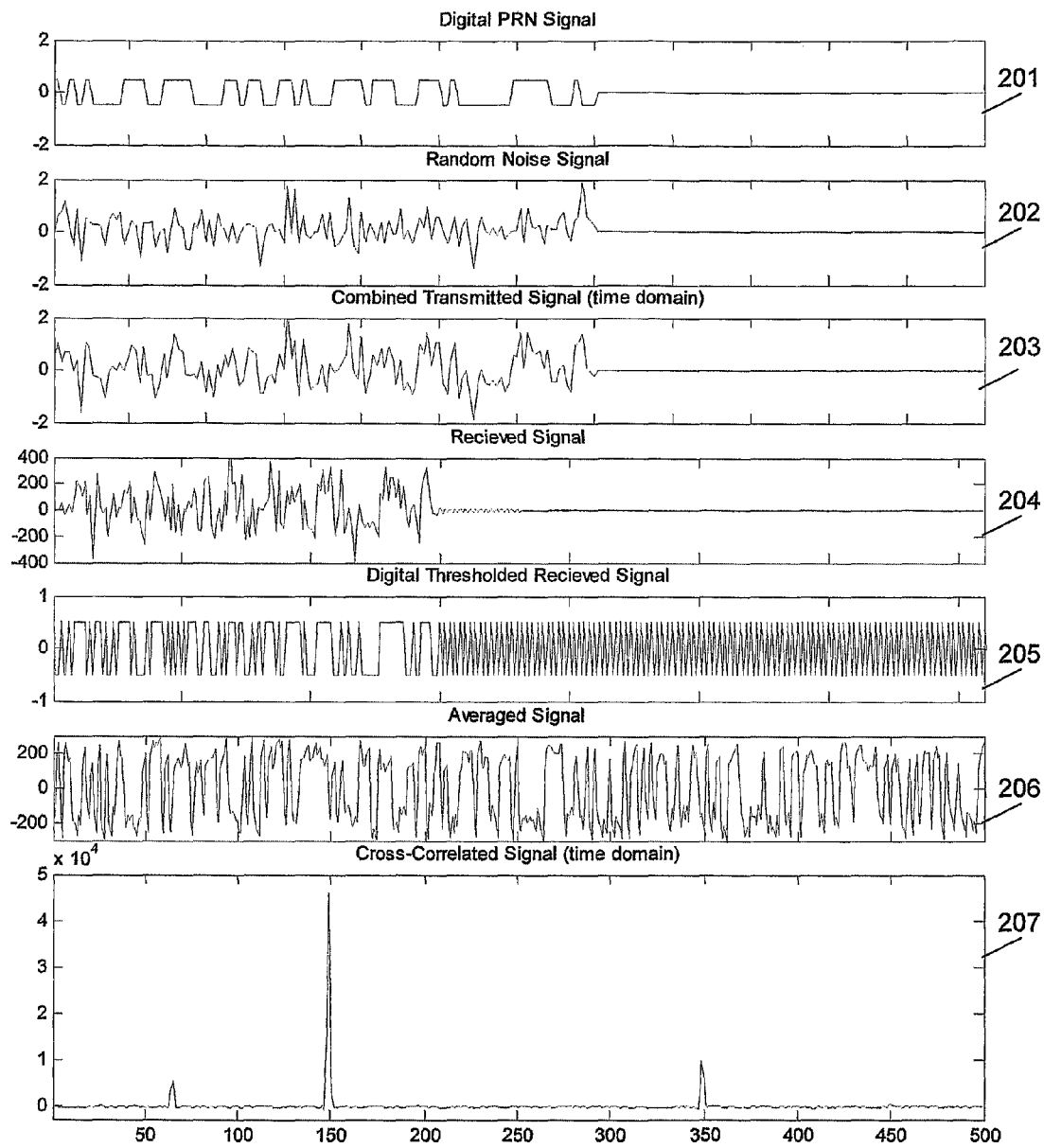
FIG. 2 illustrates transmit and receive waveforms of the radar, in conjunction with the integration and processing means.

FIG. 2 shows some example signals from different parts of the system. Firstly 201 shows a representative example of a section of the PRN signal generated by the serializer. Note the digital nature of the signal. This is then combined with the pure random noise signal 202, again noting that this has varying amplitude around 0 (not just digital as before). The combination of both these signals is shown in 203 and the power of these two signals should be similar. The transmitted signal propagates out into the environment, reflects off a number of targets and is then received. An example of the received signal is shown in 204. In the signal, there is a combination of strong and weak reflections. The digitized version of the received signal is shown in 205.

This process is repeated many thousands of times, each time transmitting a section of the PRN code and receiving back the digital sequence. After averaging the signal, an improved quality signal 206 is obtained which consists of multiple versions of the full PRN sequence shifted in time according to the location and strength of the targets in the environment. After cross correlating with the transmitted PRN code, the resultant radar range profile 207 can be obtained, the example showing three targets of varying amplitude.

Figure 3:
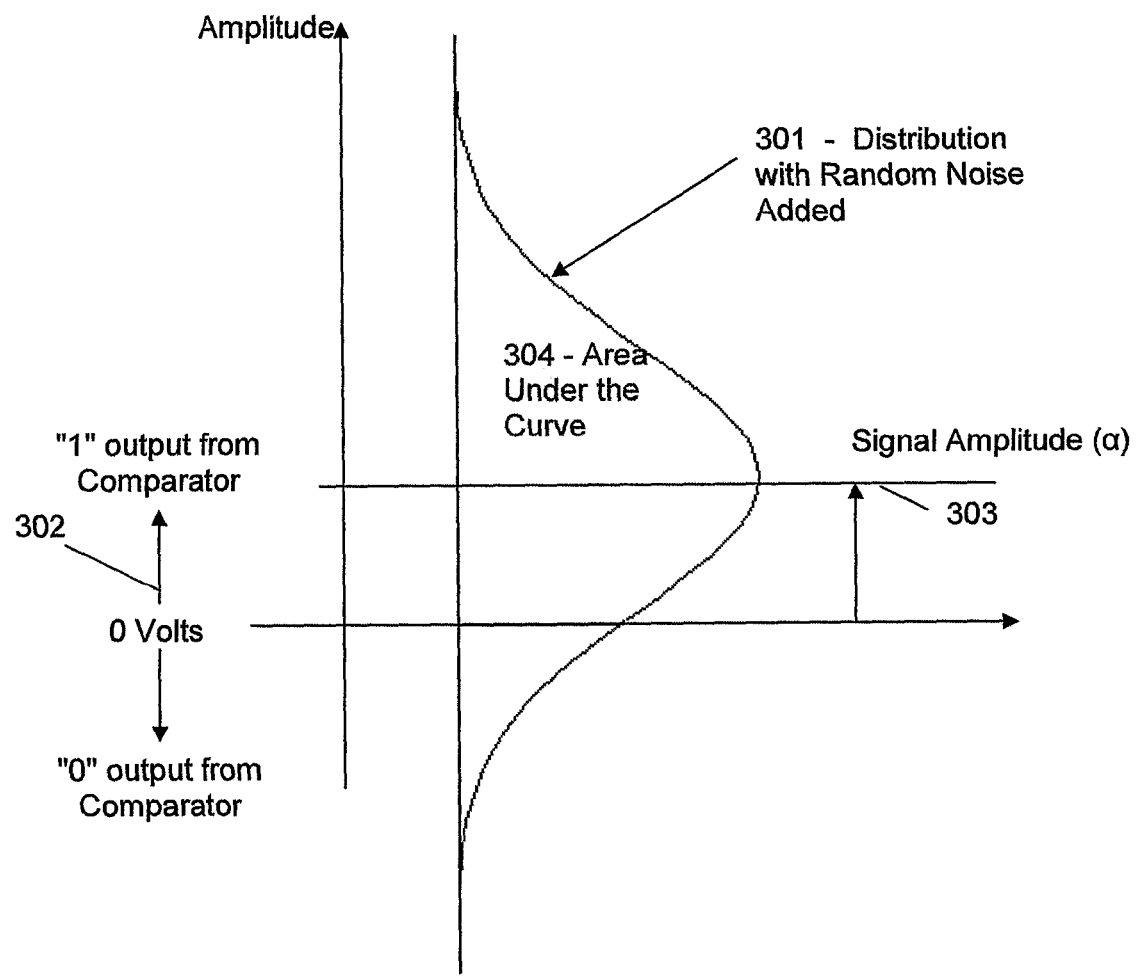
FIG. 3 illustrates the difference between the signal without noise and the signal with random noise added, in relation to the comparator threshold.

FIG. 3 shows a plot of the distribution of the combined signal and noise for a single range bin. Without noise added, the positive signal amplitude 303 shown would cause the comparator 302 to always output a "1". This is true for any positive signal, thus giving no indication of signal amplitude. With the noise added to the signal, the signal changes to being randomly distributed around the true signal amplitude 301. As the noise has a known distribution, the true amplitude of the signal can be determined.

The cumulative distribution of the combined noise and signal, is given by the function:

$$D(x)=\tfrac{1}{2}[1+\mathrm{erf}((x+\alpha)/\sigma\sqrt{2})]$$

where $\alpha$ is the strength of the signal and $\sigma$ is the standard deviation of the noise. The comparator, with its threshold centered at zero samples points from this distribution determining for each sample if it is greater that zero (thus outputting a "1") or less than zero (thus outputting a "0"). Thus probability of getting a "1" can be statistically estimated using the formula:

$$P(\text{``1''})=(\text{number of ``1''s})/(\text{total number of samples})$$

Using the cumulative distribution, the probability of getting a "1" is also equal to D(0), which is the area under the curve 304. The previous two formulas allow the signal amplitude to be determined:

$$\alpha=\sigma\sqrt{2}\mathrm{erf}^{-1}[1-2(\text{number of ``1''s})/(\text{total number of samples})]$$

Thus, the amplitude is a function of the ratio between the number of "1" output from the comparator and the number of samples taken. By averaging the signal sufficiently, the quality of this estimate improves, thus improving the SNR.

Figure 4:
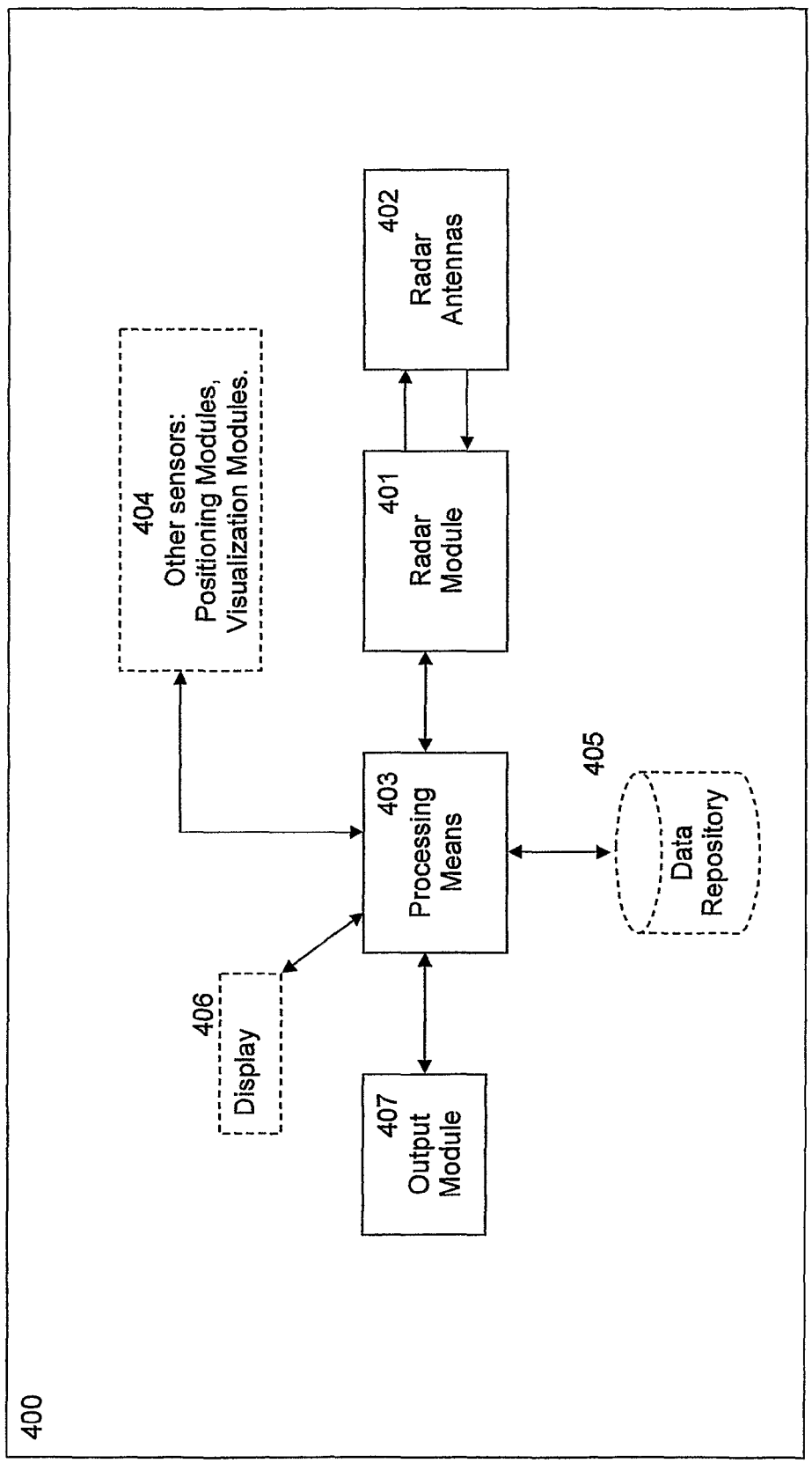
FIG. 4 is a block schematic of the radar module used in a ground penetrating radar (GPR) system.

The above radar module could be used in a number of different applications including, but not limited to:

Ground Penetrating Radar Systems
Wall Imaging Systems
Through-wall Imaging Systems
Vehicular Radar Systems
Missile Radar Systems FIG. 4 gives an example of the radar module used in a ground penetrating radar (GPR) system. In this system, the radar module 401 described above is used and the transmitter/receiver is connected to ultra wideband antennas 402, such as a bowtie antenna or horn to allow transmission of the signal into the ground. Appropriate shielding and isolation of the radar from the remainder of the system is used to reduce unwanted returns.

The received signal is then connected to a processing means 403, which allows integration with other data sources 404 such as a positioning module or visual imaging module. The processing mean can combine these data sources to produce a 3D image of the objects below the ground, in conjunction to a visual image of the ground surface. Further processing is also normally required to migrate the radar returns into a more representative 3D image of the targets. This data can then be stored in an optional data repository 405 for later retrieval. Finally the data is sent to an output module 406. One example of an output module would be a display allowing the user to interpret the data.

Wall imaging systems and through-wall imaging systems would have a similar structure to the GPR system. However, different radar antennas, positioning modules, processing means and output modules may be required.

Figure 5:
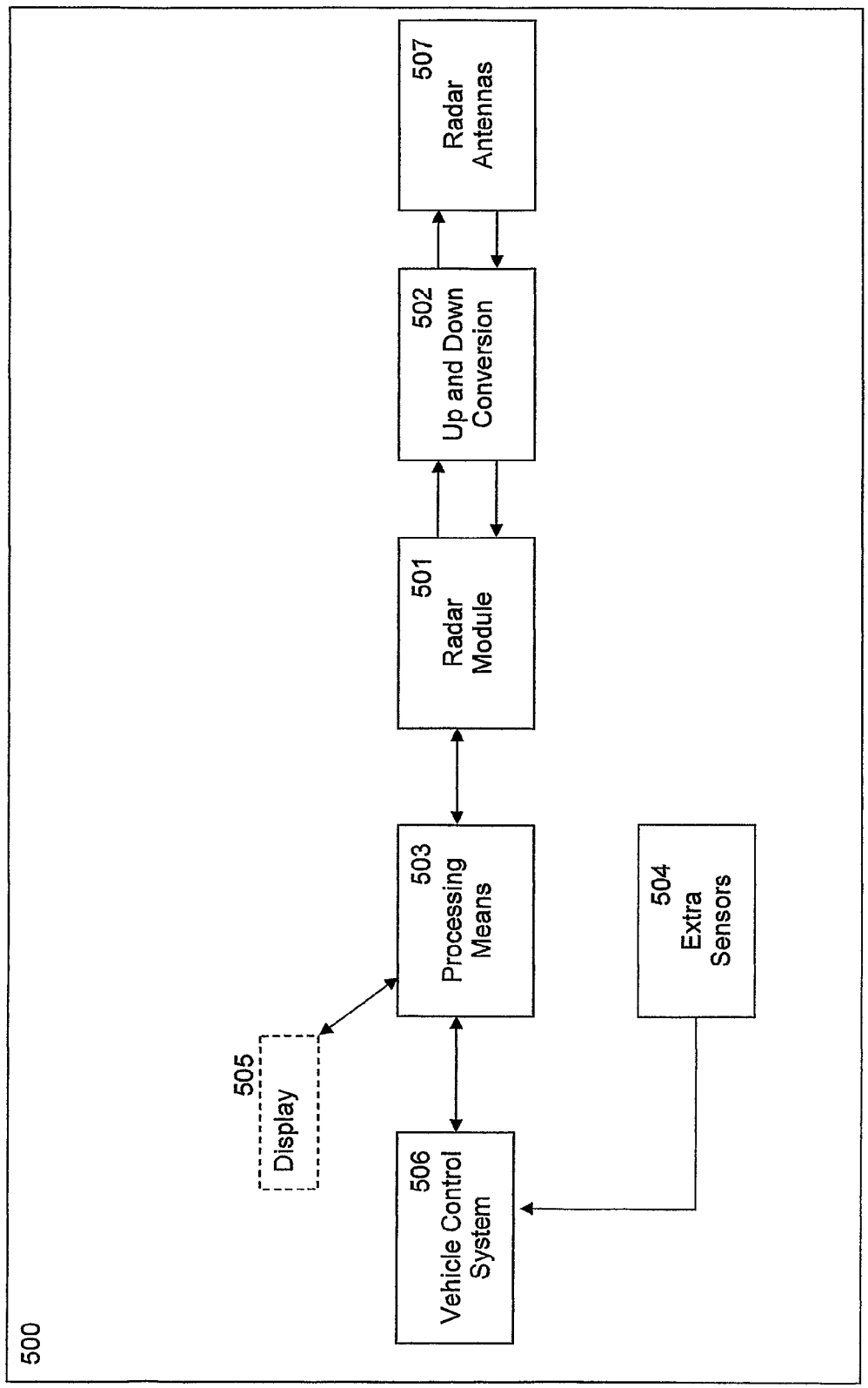
FIG. 5 is a block schematic of the radar module used in a vehicular radar system.

FIG. 5 demonstrates the radar system as used in a vehicle control system 500. In contrast to the previous example, the proposed radar module's 601 transmit and receive signals are sent to an up and down conversion module 502 prior to transmission, to translate the signal to the frequency range of a automotive radar. Again antennas 507 are required to transmit the signal into the environment and receive the returned echo. Possible antennas include patch antennas or horn antennas. For automotive applications the radar would detect the range of objects within the radar beam. This signal would be sent to a processing means 503, before being combined with other sensors 504 in a vehicle control system 506. The vehicle control system would then control the car to respond appropriately to the presence of close objects, by operating the brake or via other control measures. An optional display 505 could also be used to show to the driver the presence of nearby objects. A missile control system would operate in a similar way.

VARIATIONS

It will be realized that the foregoing has been given by way of illustrative example only and that all other modifications and variations as would be apparent to persons skilled in the art are deemed to fall within the broad scope and ambit of the invention as herein set forth.

Throughout the description and claims to this specification the word "comprise" and variation of that word such as "comprises" and "comprising" are not intended to exclude other additives, components, integers or steps.

The invention claimed is:

1. A radar system comprising:
   a. a transmitter that transmits a predefined wideband signal;
   b. a digital receiver that records a returned signal with a one-bit analog to digital converter (ADC) to produce a digitized returned signal;
   c. a random noise source that adds random noise to the transmitted signal or to the returned signal; and
   d. a processing means wherein the digitized returned signal is distorted to compensate for the effects of noise on the digital receiver.

2. The radar system of claim 1 wherein the random noise source is of similar signal strength to the wideband signal or the returned signal.

3. The radar system of claim 1 wherein the predefined wideband signal is a pseudo random noise signal.

4. The radar system of claim 1 wherein the random noise is added to the signal prior to transmission.

5. The radar system of claim 1 wherein the random noise is added to the returned signal before digitizing.

6. The radar system of claim 1 wherein the digital receiver is a deserialiser.

7. The radar system of claim 1 wherein the processing means includes an accumulator that combines data in a circular buffer.

8. The radar system of claim 1, where the digitized returned signal is distorted using an inverse erf function.

9. The radar system of claim 1, where the distribution of the added random noise is modified to achieve the equivalent of post distortion of the received signal.

10. The radar system of claim 1 wherein the predefined wideband signal is part of a pseudo random noise signal.

11. The radar system of claim 1 further comprising an up/down conversion stage to translate signals from a baseband into a higher frequency range.

12. The radar system of claim 1, where the processing means distorts the digitized received signal to compensates for the effects of both the signal and noise distortion.

13. A radar system that images a target comprising:
a. a transmitter that transmits a predefined wideband signal towards a target;
b. a receiver that receives the returned signal from the target;
c. a digitizer that digitizes the returned signal using a one bit analog to digital converter (ADC) to produce a digitized returned signal;
d. a random noise source that adds random noise to the wideband signal or the returned signal; and
e. a processor that processes the returned signal to image the target, wherein the digitized returned signal is distorted to compensate for the effects of noise in the receiver.

14. The system of claim 13 wherein the processor performs cross-correlation of the returned signal with the predefined wideband signal.

15. The system of claim 14 wherein the processor performs averaging before cross-correlation.

16. The system of claim 13 wherein random noise is added to the wideband signal prior to transmission.

17. The system of claim 13 wherein random noise is added to the returned signal prior to digitizing.

18. The system of claim 13 further including the step of gating wherein transmitting and receiving occurs at different times.

19. The system of claim 13 wherein the image of the target is a three dimensional image.

20. The system of claim 19 further including the step of integrating data from other data sources to produce the three dimensional image.

* * * * *